United States Patent [19]

Dearien, Jr.

[11] Patent Number: 5,114,073
[45] Date of Patent: May 19, 1992

[54] WHEEL AND RAIL ASSEMBLY

[76] Inventor: John A. Dearien, Jr., 2329 Belmont, Idaho Falls, Id. 83404

[21] Appl. No.: 789,440

[22] Filed: Nov. 6, 1991

Related U.S. Application Data

[63] Continuation-in-part of Ser. No. 427,781, Oct. 27, 1989, abandoned.

[51] Int. Cl.⁵ .......................... E01B 5/14; B61F 9/00; B61K 5/04
[52] U.S. Cl. ........................................ 238/15; 238/16; 238/122; 104/245
[58] Field of Search .......................... 238/3-5, 238/15, 16, 121-128, 134, 135, 145, 148; 104/69, 245; 105/96

[56] References Cited

U.S. PATENT DOCUMENTS

| | | | |
|---|---|---|---|
| 1,070,248 | 8/1913 | Haldeman | 238/5 |
| 2,046,448 | 2/1934 | De Buigne | 105/165 |
| 3,788,233 | 1/1974 | Colovas et al. | 104/88 |
| 4,212,247 | 7/1980 | Lusk . | |
| 4,435,829 | 3/1984 | Siler et al. | 378/60 |

FOREIGN PATENT DOCUMENTS

| | | | |
|---|---|---|---|
| 9185 | 3/1853 | France | 238/3 |
| 728393 | 7/1932 | France | 238/3 |

Primary Examiner—Joseph F. Peters, Jr.
Assistant Examiner—Virna Lissi Mojica
Attorney, Agent, or Firm—Robert A. de Groot; Stephen A. Gratton; Stephen R. May

[57] ABSTRACT

A laterally stable and self-turning wheel and rail assembly. The curved rolling surfaces of the wheels bear against curved contact surfaces of the rails such that centrifugal force causes lateral translation of the wheels on the rails, thereby increasing the effective rolling radius of an outside rail while decreasing or maintaining the same effective rolling radius of an inner wheel. The altered rolling radius causes the wheels to move along a curved path without slipping or sliding. Flanges are provided adjacent track turnouts so that guide members activated by a vehicle operator may contact the flanges to either maintain the vehicle in the same set of tracks, or switch the vehicle through the turnout onto a new section of track.

1 Claim, 9 Drawing Sheets

Figure 1

"PRIOR ART"

WHEEL AND RAIL ASSEMBLY

This application is a file wrapper continuation-in-part, pursuant to 37 CFR 1.62, of U.S. application Ser. No. 07/427,781 filed on Oct. 27, 1989 and entitled "Improved Wheel and Rail Assembly", now abandoned.

BACKGROUND OF THE INVENTION

Figure 1:
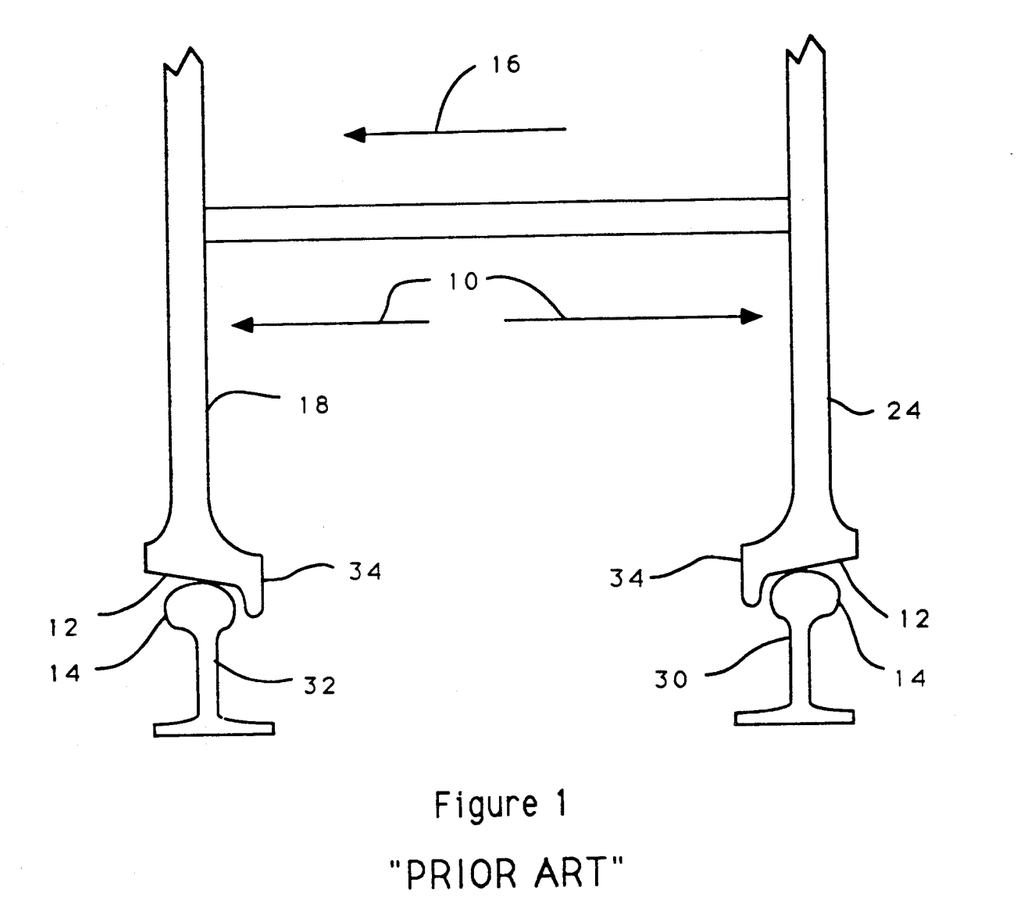
FIG. 1 is a sectional view of a prior art wheel and rail system.

Numerous configurations have been proposed for building wheeled vehicles over a pair of equally-spaced rails, ranging from intercontinental railroads, narrow-gauged cog railways, computer-assisted robotic inventory retrieval systems, moving beds of machine tools, etc. All such wheel and rail systems require that the wheels be retained upon the rails, either forcibly through the use of flanges, or by virtue of the fact that the weight of the vehicle retains the wheels in a track (such as a V-shaped wheel rolling within a recessed V-shaped channel track). Generally speaking, at least one pair of wheels per vehicle is driven by a solid axle therebetween. However, because the wheels are preferably fixed to the axle and are therefore forced to turn at the same peripheral rotational velocity, many such systems force the wheel positioned radially inwardly during a turn to slip or slide on the rail, since it travels a shorter distance through a turn than the radially outermost wheel. Conventional railroad wheel and rail assemblies solve this problem, as illustrated in FIG. 1, by providing a railroad wheel 10 with an inwardly sloping planar bearing surface 12 which contacts the rail 14. As centrifugal force and the tendency of the wheel assembly to follow a tangent to the curve pushes the vehicle (and the pair of wheels) to one side, in the direction of arrow 16, during a turn in the direction opposite that of arrow 16, the new rolling radius of outer wheel 18 is increased over that of the previous rolling radius. Coincidentally, the innermost wheel 24 also moves in the direction of arrow 16, resulting in a new, shorter rolling radius when compared with the previous rolling radius. Therefore, the innermost wheel 24 travels a shorter distance on the innermost rail 30 than does the outermost wheel 18 on outermost rail 32.

In order to change any rail-mounted vehicle from one set of rails to another, most prior art systems have relied upon means external of the vehicle to effect the change. For instance, in the conventional railroad wheel/rail apparatus illustrated in FIG. 1, the flanges 34 positioned on the inner side of each wheel are utilized to guide the vehicle onto an alternate track, the rails of which are positioned adjacent to the rails 30, 32. Upon engaging the alternate, or turnout rails, the flange forces the wheel to divert its direction in the direction of the turnout rails. During such a change in tracks, the flanges of both wheels must cross one of the rails and a slot must be provided in this rail to permit the wheel flange to traverse the width of the rail.

Although utilizing a different rail and wheel geometry than conventionally utilized, U.S. Pat. No. 2,046,448, De Buigne, provides a flanged wheel, and in some embodiments a notched rail, in order to effect track changes. U.S. Pat. No. 3,788,233, discloses a guided vehicle transportation system having switched wheels effecting changes in vehicle direction.

Therefore, there is a need for a method of transportation, not disclosed in the prior art, whereby lightweight materials may be utilized in a rail transmit system which does not rely on conventional flanged-wheel technology.

SUMMARY OF THE INVENTION

The present invention comprises a rail transportation system whereby lightweight materials may be incorporated into wheeled vehicles traversing a rail system. The vehicle is provided with at least two pairs of wheels, each pair of wheels being laterally disposed at distal ends of and securely affixed to an axle. At least one of the axles is preferably a drive axle, being driven by any conventional means. Each of the wheels is provided with a curved rolling surface having a first radius of curvature. A pair of laterally-spaced rails cooperate with the wheels, each of the rails having a curved contact surface having a second radius of curvature. The first and second radii of curvature are different from one another. When the vehicle encounters a curved portion of the rails, centrifugal force and the tendency to follow a tangent to the curve displaces the vehicle laterally, causing the effective rolling radius of the outermost wheel to be increased, relative to the effective rolling radius of the innermost wheel. Therefore, the outermost wheel travels a greater distance than the innermost wheel, preventing slippage of the inner wheel. When the vehicle is moving in a straight line, the effective rolling radii of each of a pair of wheels is identical.

In a first embodiment of the invention, the wheels are provided with convex rolling surfaces, and the rails are provided with concave contact surfaces. The radius of curvature of the wheels is less than the curvature of the rails, so that the wheels nest on the rails providing a cross-section similar to the cross-section of a "ball-and-partial socket" configuration.

In a second embodiment of the invention, the ball-and-socket configuration of the wheel and rail apparatus is maintained, however the wheel comprises a concave rolling surface and the rail comprises a convex contact surface. The radius of curvature of the rail contact surface is less than the radius of curvature of the wheel rolling surface so that the rail "nests" within the wheel in a ball-and-socket configuration.

Flanges external to the wheel and rail system are utilized to implement a change in course of the wheels onto a second set of tracks.

DETAILED DESCRIPTION OF THE INVENTION

Figure 2A:
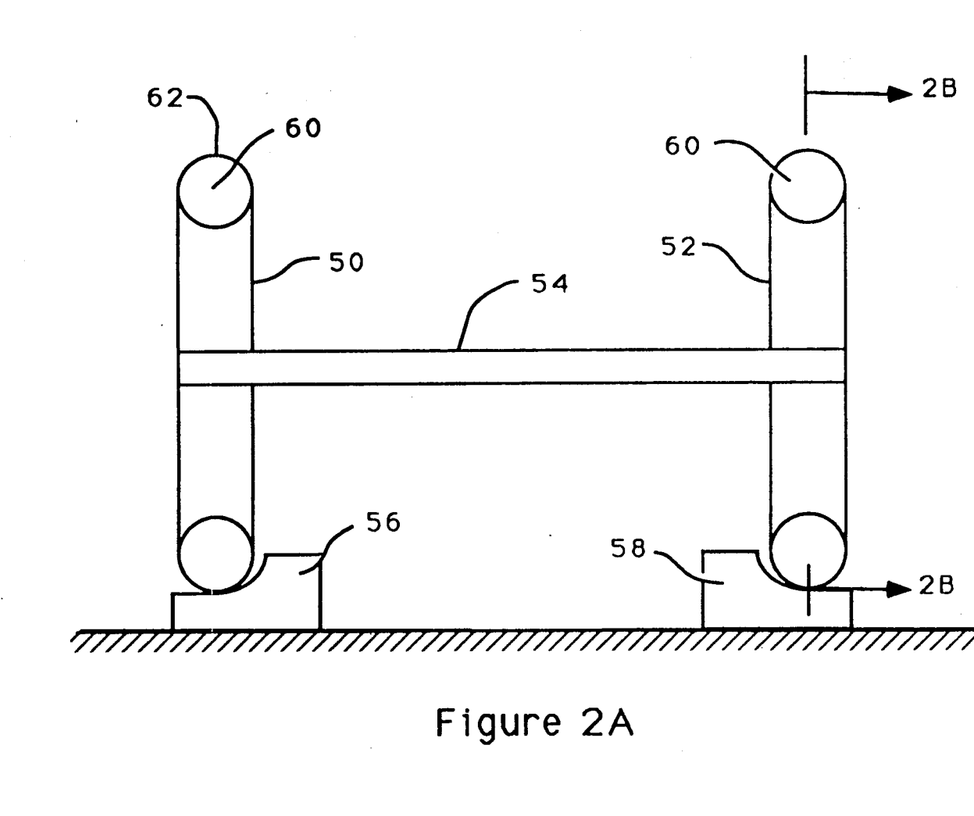
FIG. 2A is a sectional view of a wheel and rail assembly of the present invention.
Figure 2B:
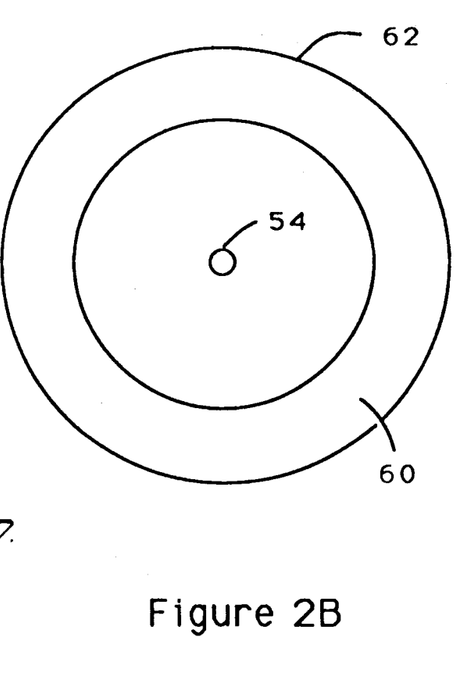
FIG. 2B is a section of a wheel taken along lines 2B—2B of FIG. 2A.

A first embodiment of the present invention is illustrated in FIG. 2A, wherein a pair of wheels 50, 52 are securely affixed to an axle 54 and follow a path defined by a pair of rails 56, 58. The rails are positioned in conventional manner either directly onto a road bed or are constrained on ties positioned laterally to the linear direction of rails 56, 58. The wheels, as illustrated in FIG. 2B, are provided with a peripheral portion 60 which has a curved rolling surface 62.

Figure 3:
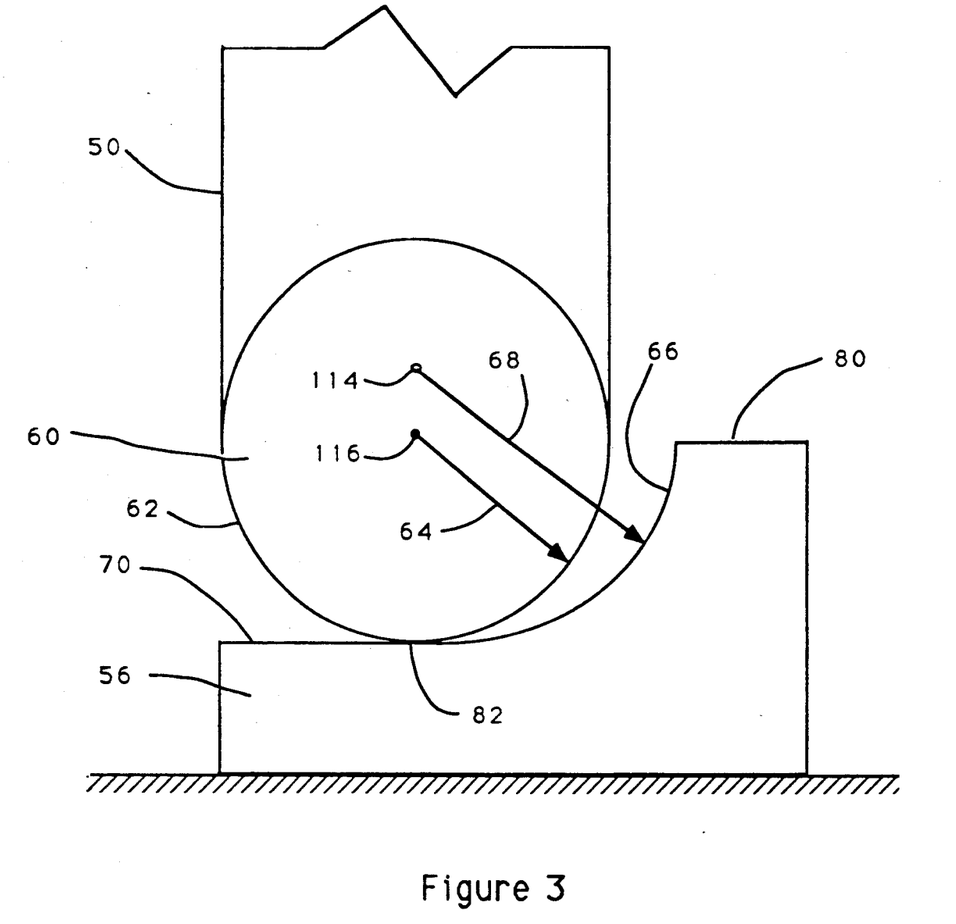
FIG. 3 is an enlarged partial section view of an outermost wheel and rail section.

As illustrated in FIG. 3, the curved rolling surface 62 of the peripheral portion 60 is provided with a first radius of curvature 64, which is oriented in a plane perpendicular to the plane of the wheel itself. Likewise, track member 56 is provided with a curved contact surface 66 which has a second radius of curvature 68. As illustrated in the first embodiment of FIG. 3, the centerpoint 114 of the second radius of curvature 68 is located inwardly (or "above") of the centerpoint 116 of the first radius of curvature 64, relative to the radius of the wheel 50. The rail 56 may be provided with a generally planar, horizontal rolling surface 70 upon which the wheel 50 rolls when the vehicle is moving in a straight line. The rails 56 may be provided with a shoulder 80 to supply structural support to the upper portion of the rail 56. While the rail 56 is illustrated in the figures herein with a constant radius of curvature 68, it is to be understood that an increasing- or decreasing-radius of curvature on rail 56 may be advantageous. When the wheels are rolling along a straight section of track, the contact point 82 of each wheel will be on the horizontal rolling surface 70, or just onto the curved surface 66.

The general configuration of the curved rolling surface 62 and curved contact surface 66 as illustrated in cross-section in the figures is that of a ball-and-socket joint, with the surface 62 nesting within the surface 66. Of course, in actuality, the "socket" is an elongate partial slot, while the "ball" is the circumferential edge portion of the wheel. As illustrated, the radius of curvature 68 of surface 66 is greater than the radius of curvature 64 of surface 62.

Figure 4:
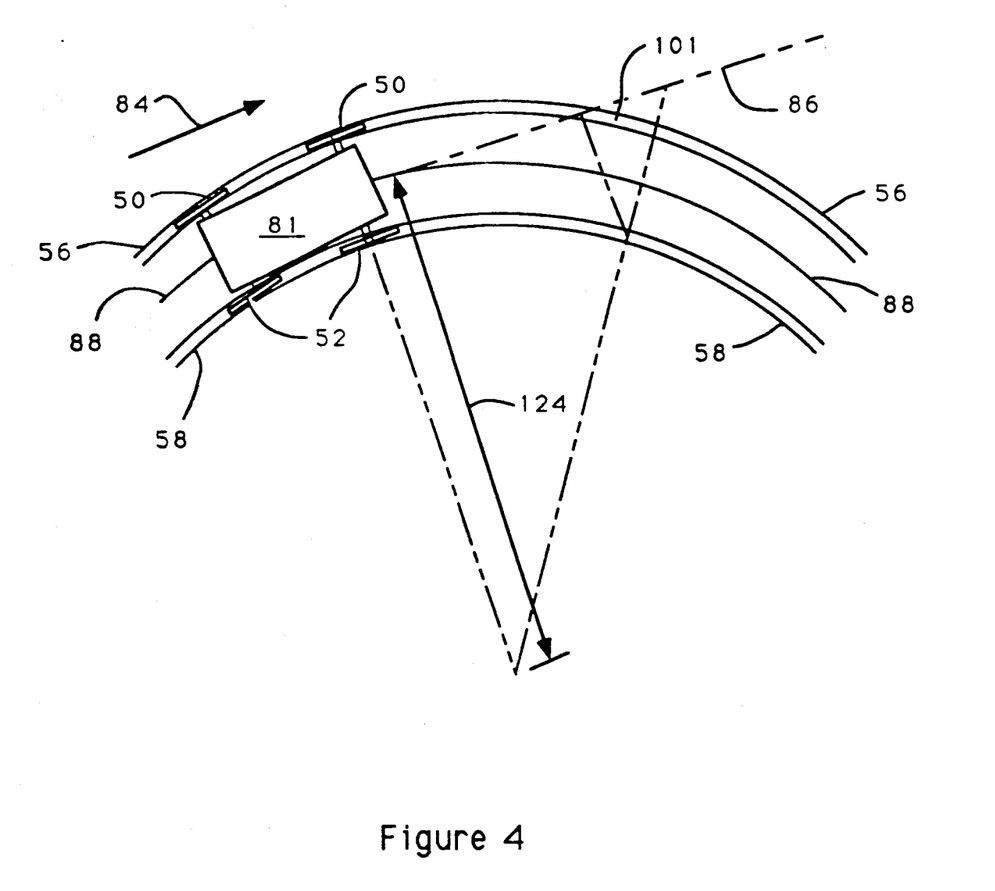
FIG. 4 is a plan view of a curved rail portion.
Figure 5:
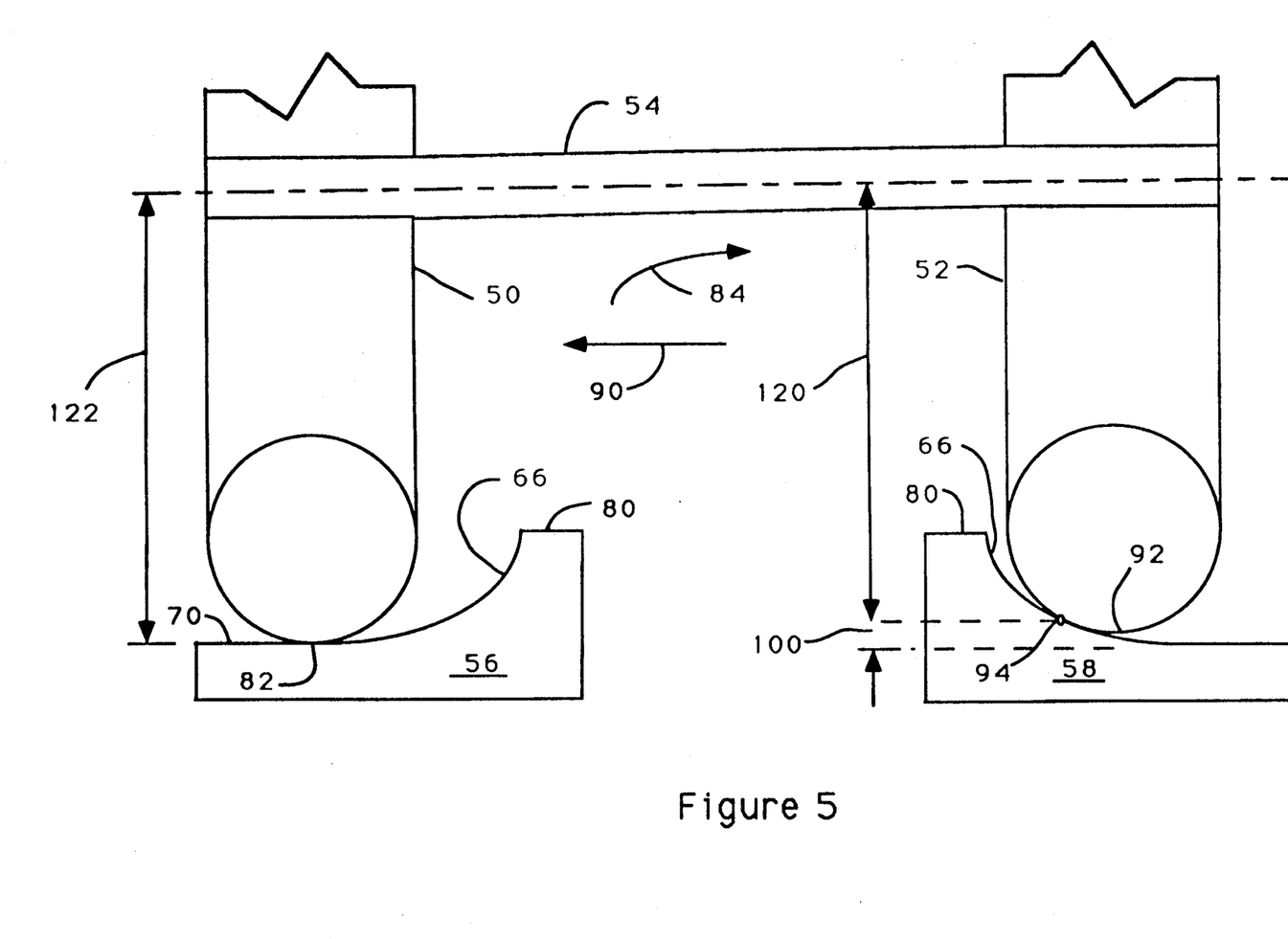
FIG. 5 is an enlarged section view of the wheel and rail assembly.

FIG. 4 illustrates a curved section of track wherein rails 56, 58 turn to the "right" relative to the direction of travel of the vehicle 81, as indicated by arrow 84. In the embodiment of FIG. 4, the innermost wheels and rail are designated 52, 58 respectively, and the outermost wheels and rail are designated 50, 56 respectively. Traversing the curve of FIG. 4, centrifugal force and a tendency to follow a straight line tends to "push" the vehicle outwardly on a tangent 86 to the centerline 88 of tracks 56, 58. This lateral movement of the vehicle, including the wheels, is illustrated in FIG. 5. The movement of the vehicle in the direction of 84 induces lateral movement in the direction of arrow 90, or to the left in FIG. 5. As illustrated, the rails 56, 58 are provided with the shoulders 80 inwardly of the wheels, 50, 52. As illustrated, lateral movement of the wheels to the left in FIG. 5 causes the contact point 82 of wheel 50 to move onto the horizontal surface 70 of rail 56. Coincidentally, the previous contact point 92 (the contact point when the vehicle is moving in a straight line) is moved to the left and upwardly, at 94, further up the curved contact surface 66 of rail 58.

Figure 6:
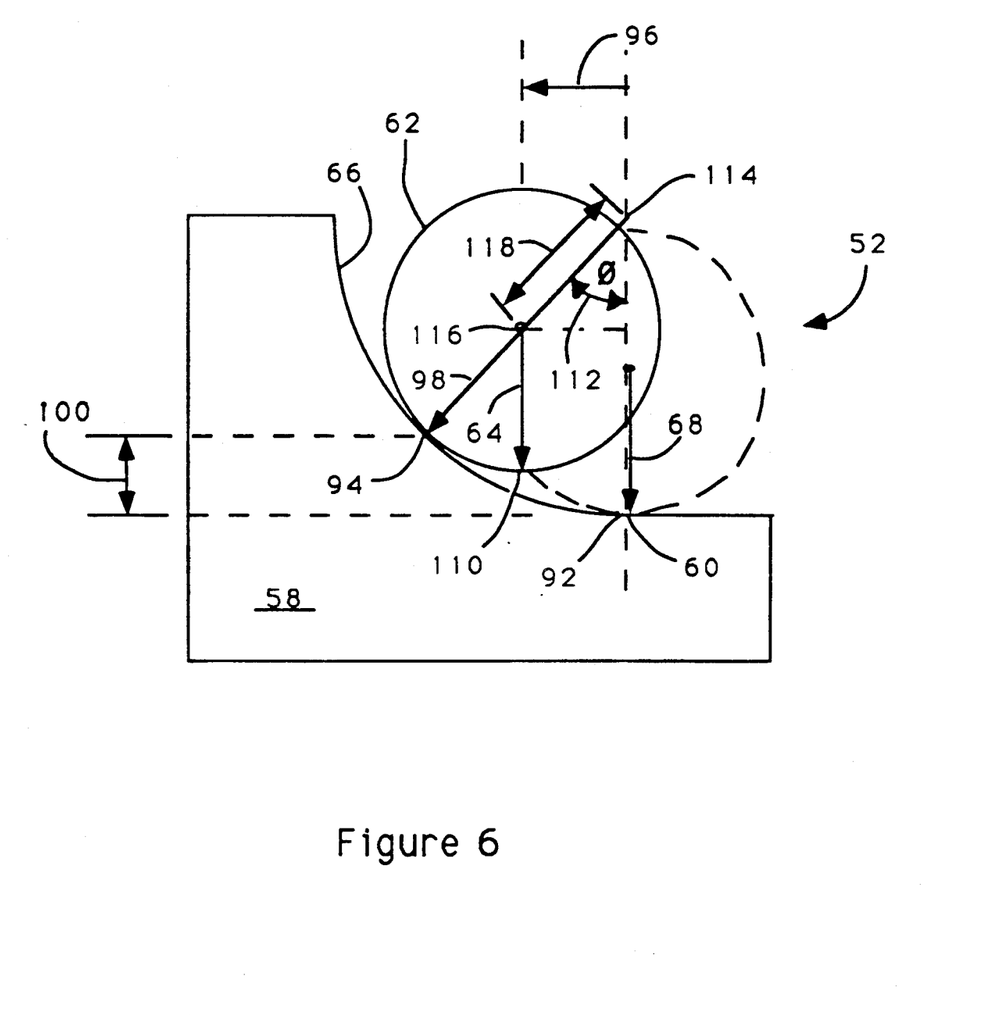
FIG. 6 is an enlarged partial section view of an innermost wheel and rail section.

The effect of this change in the contact point is illustrated in greater detail in FIG. 6. The asymmetric geometry of the curved rolling surface 62 of the wheels and the curved contact surface 66 of the rails permits the wheel to maintain a single contact point as it moves "up" or "down" the contact surface 66. For the preferred embodiment employing constant radius surfaces 62, 66, the modification of the effective rolling radius of the wheels resulting from the wheel and rail geometry is illustrated in FIG. 6. As illustrated therein the previous location of the peripheral portion 60 of wheel 50 is indicated by broken lines, and the location of the wheel indicated in FIG. 6 is illustrated in solid lines. A lateral translation of the centerline of the wheel is indicated at 96 resulting in a change from the previous contact point 92 to the contact point 94. The new contact point 94 will always be located on a line extending through the local center of curvature of the rolling surface 62 and contact surface 66, since in order for two curved surfaces to make contact, they must have the same surface slope at the point of contact. Because the local center of curvature is perpendicular to the local slope, the centers of curvature of contacting curved surfaces lie on co-linear perpendiculars, and thus on the same line. Therefore, line 98 in FIG. 6 is the co-linear radius of curvature of contact surface 66 as well as the radius of curvature of rolling surface 62.

By virtue of the fact that the contact point moves "upwardly" on the wheel as illustrated in FIG. 6, the effective rolling radius of the wheel is decreased. The decrease in the rolling radius, illustrated at 100, is equal to the vertical distance between the new contact point 94 and the lowermost surface 102 of the wheel. The angle phi 112 is generated by rotating the radius 68 from the original contact point 92 to the new contact point 94. The change in the rolling radius 100 is equal to $$\text{(Change in rolling radius 100)} = \text{(Wheel rolling surface radius 64)} \times (1 - COS(phi)) \qquad (1)$$

The cosine of phi may be calculated by utilizing the lateral displacement 96 and the distance between the center of curvature 114 of radius 68 and the new location 116 of the center of curvature of radius 64, with the Pythagorean Theorem:

$$COSINE\ (phi) = ((rt-rw)^2 - dw)^{0.5}/(rt-rw). \qquad (2)$$

wherein, rt = radius of curvature 114 of rail 56
rw = radius of curvature 64 of wheel 50
dw = lateral displacement 96 of wheel 50

Referring again to FIG. 5, the consequence of the "inside" wheel 52 rotating about a smaller effective rolling radius 120 than the effective rolling radius 122 of the "outside" wheel, is that the pair of wheels 50, 52 fixedly secured to axle 54 may rotate about a curved path 84 without slippage of the inside wheel 52. The distance travelled by the outside wheel d(o) 50 during a rotation theta of axle 54 is:

$$D(o) = \text{theta} \ X \ ro \qquad (3)$$

where ro is the effective rolling radius 122 of wheel 50.

The distance D(i) travelled by the inside wheel 52 during a rotation theta of axle 54 is $$D(i) = \text{theta} \ X \ ri \qquad (4)$$

where ri is the effective rolling radius 120 of inside wheel 52.

Therefore, when the effective rolling radius (ro) 122 (FIG. 5) of outside wheel 50 is greater than the effective rolling radius 120 (ri) of inside wheel 52, the distance travelled by the outside wheel D(o) is greater than the distance travelled by the inside wheel D(i). The radius 124 of the curved track (FIG. 4) is a function of the difference 100 in the effective rolling radii of the inner and outer wheels, the average rolling radius of the wheels, and the distance between the contact point 82 of the outside wheel and the contact point 44 (FIG. 5) of the inside wheel.

The difference (dd 10) (FIG. 4) in the distance D(i) travelled by the inside wheel and the distance D(o) travelled by the outside wheel, is calculated as:

$$dd = \theta \times (ro\ 122 - ri\ 120) \quad (5)$$

and by the relationship of similar triangles, illustrated in FIG. 5.

The radius of curvature becomes:

$$\text{(Contact point separation distance 124)}/(dd) = \quad (7)$$
$$(rc\ 124)/(D(o)/2 + D(i)/2)$$

Utilizing equation 3 and 4, the radius of curvature (rc) 124 traversed by the vehicle is mathematically described by:

$$rc\ 124 = \text{(separation distance 126)} \times \quad (6)$$
$$\text{(average wheel rolling radius)}/\text{(difference in rolling radii 100)}$$

It is to be appreciated that the rail geometry illustrated in this first embodiment must be altered somewhat at a track turnout or crossover. For the same reason that conventional rails must be notched to permit flanged wheels to crossover, so must the geometry of the rails 56, 58 be altered to permit change of direction. For example, because the shoulder 80 on each rail is disposed inwardly from the wheel, only the shoulder of the outermost rail at a turnout need be altered. Such outermost rail, or the rails at the location of a crossover, may have the shoulder 80 removed such that a rail comprises merely the horizontal surface 70.

The apparatus of the present invention, as illustrated in FIG. 5, operates such that one of the two wheels will usually be travelling on the horizontal portion 70 of the rail while the other is bearing against the curved portion 66 of the other rail. Therefore, when the wheels move laterally during a turn, the effective rolling radii of both wheels does not change—the rolling radius of one will remain essentially constant while the other either increases or decreases. For example, in the embodiment of FIG. 4, the outermost wheel 50 moves laterally in the direction of arrow 90 but remains on horizontal portion 70, maintaining a rolling radius equal to its straight-line rolling radius. The inner wheel 52 moves laterally also, moving the contact point from 92 to 94, and decreasing the effective rolling radius. The situation is reversed, with the inner wheel rolling radius remaining constant, and the outer wheel rolling radius increasing, in the embodiment of FIG. 9, as described below.

Figure 7:
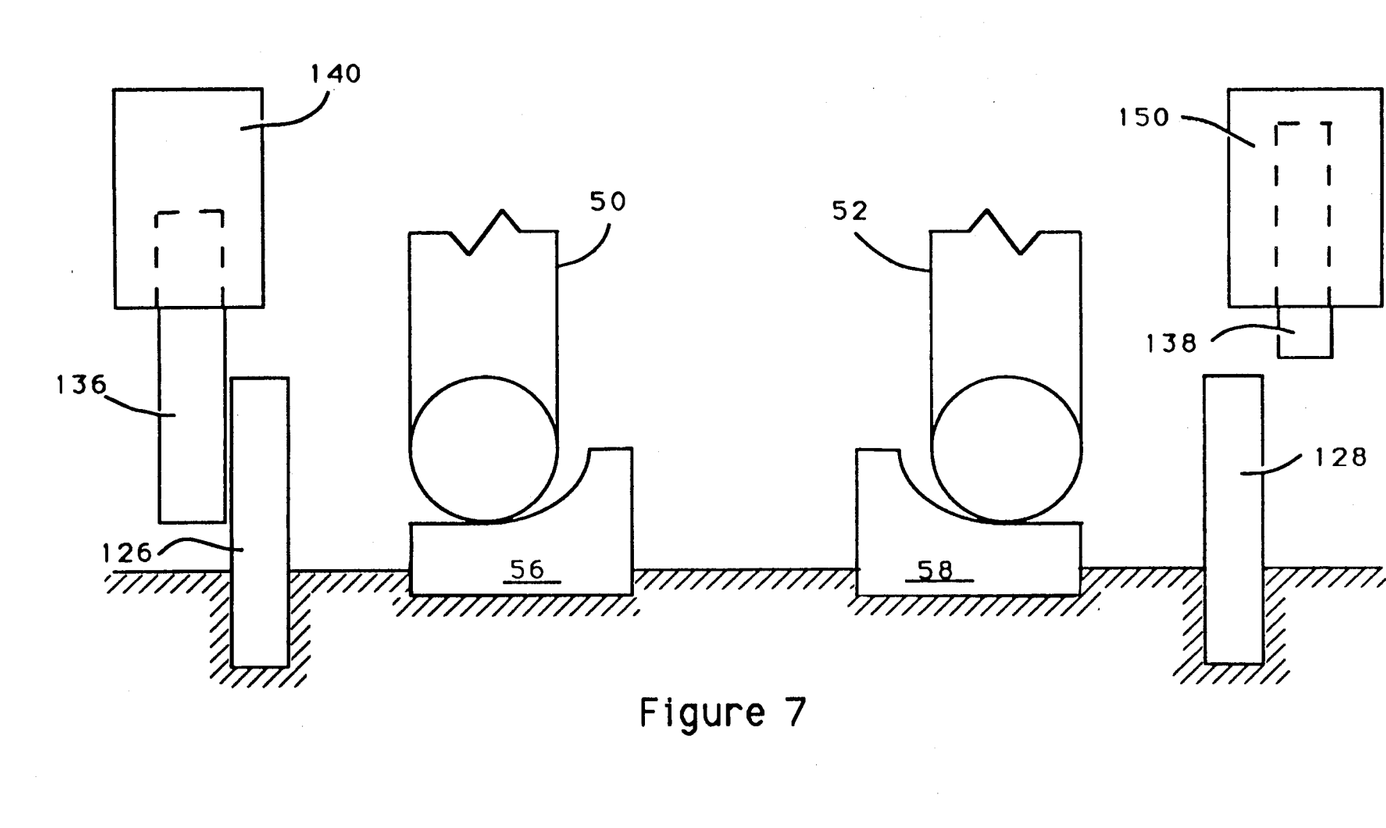
FIG. 7 is a schematic representation of the turning means of the present invention.
Figure 8:
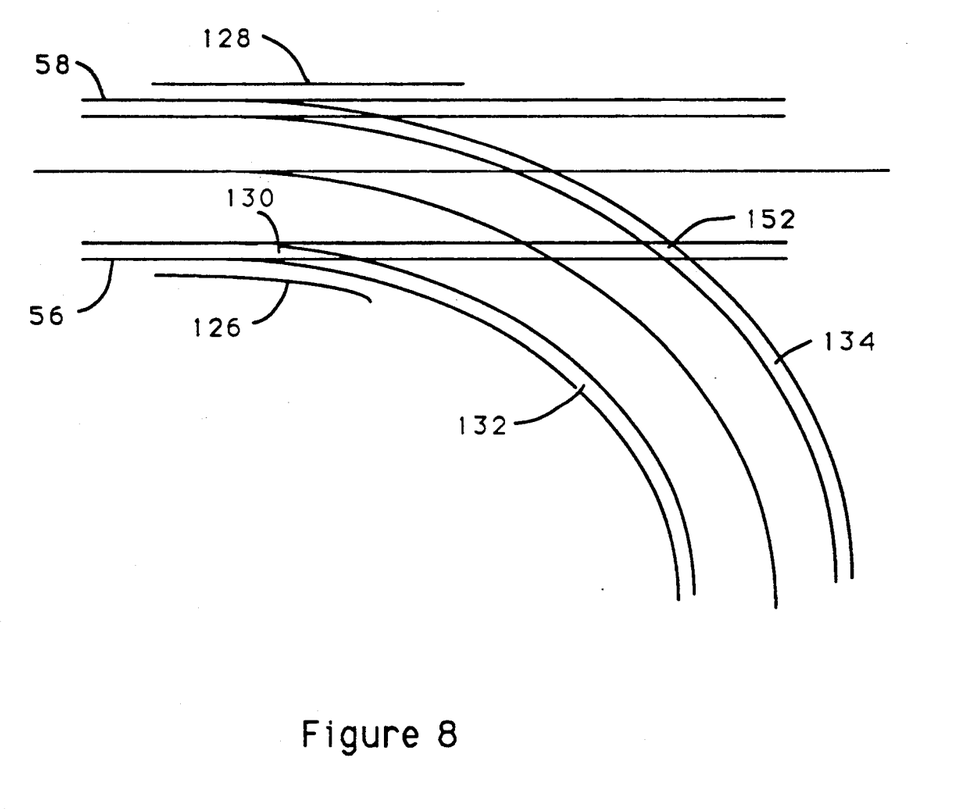
FIG. 8 is a schematic representation of a turnout.

Turning of a vehicle from on set of tracks to another set of tracks is effected by apparatus illustrated in FIG. 7. Rather than turning the vehicle with flanges, located on the wheels (FIG. 1) a section of track immediately prior to a junction with a second set of tracks is provided with lateral flange members 126, 128 securely embedded adjacent the rails 56, 58. For example, as illustrated in FIG. 8, the lateral flange 126 is embedded adjacent rail 56, extending beyond the junction 130 of rail 56 and new rail 132. While the preferred embodiment of the present invention utilizes the flange and guide members only to assist in effecting a turn, such members may be utilized at any point along the track, even a straight portion, to provide lateral stability. For example, in a high-speed turn or an area subject to high cross-winds, the flange/guide members may be utilized to assure the vehicle does not leave the track.

The flange 126 need be positioned adjacent only one of the rail combinations 56/132 or 58/134 in order to effect a turn of the vehicle onto the new set of tracks. As illustrated, the flanges 126, 128 (FIG. 7) cooperate with guide members 136, 138 positioned outwardly from flanges 126, 128. Guide members 136, 138 are removably retained within control devices 140, 150 and may be either extended (as is guide 136) or retracted (as is guide 138) from within the vehicle to which the guide members 140, 150 are appended. Conventional control means, such as pneumatic pistons or hydraulic cylinders may be utilized to actuate the guide members 136, 138. When extended guide member 136 overlaps flange 126, causing the vehicle to follow the path defined by flange 126. Alternatively, if the vehicle is intended to proceed straight through an intersection with a turnout track as illustrated in FIG. 8, the guide member 138 would be lowered (with the guide member 136 retracted) so that the vehicle maintains the straight-line path indicated by flange 128. The guide members 136, 138 may take any convenient form, either as frictionally engaging members as illustrated in FIG. 7, or may be roller bearing assemblies, or any other form well-known to those skilled in this art. Therefore, the decision to effect a turn from one set of rails to another set of rails is made by an operator of the vehicle, not by some external instrumentality which is responsible for switching rails. In the apparatus of the present invention, rails are not moved or switched—turns are made by lowering the guide members to contact permanently placed flanges, so that the vehicle is guided through a turn chosen by the vehicle operator. A turn is made only if the vehicle operator makes the decision to make such turn.

Figure 9:
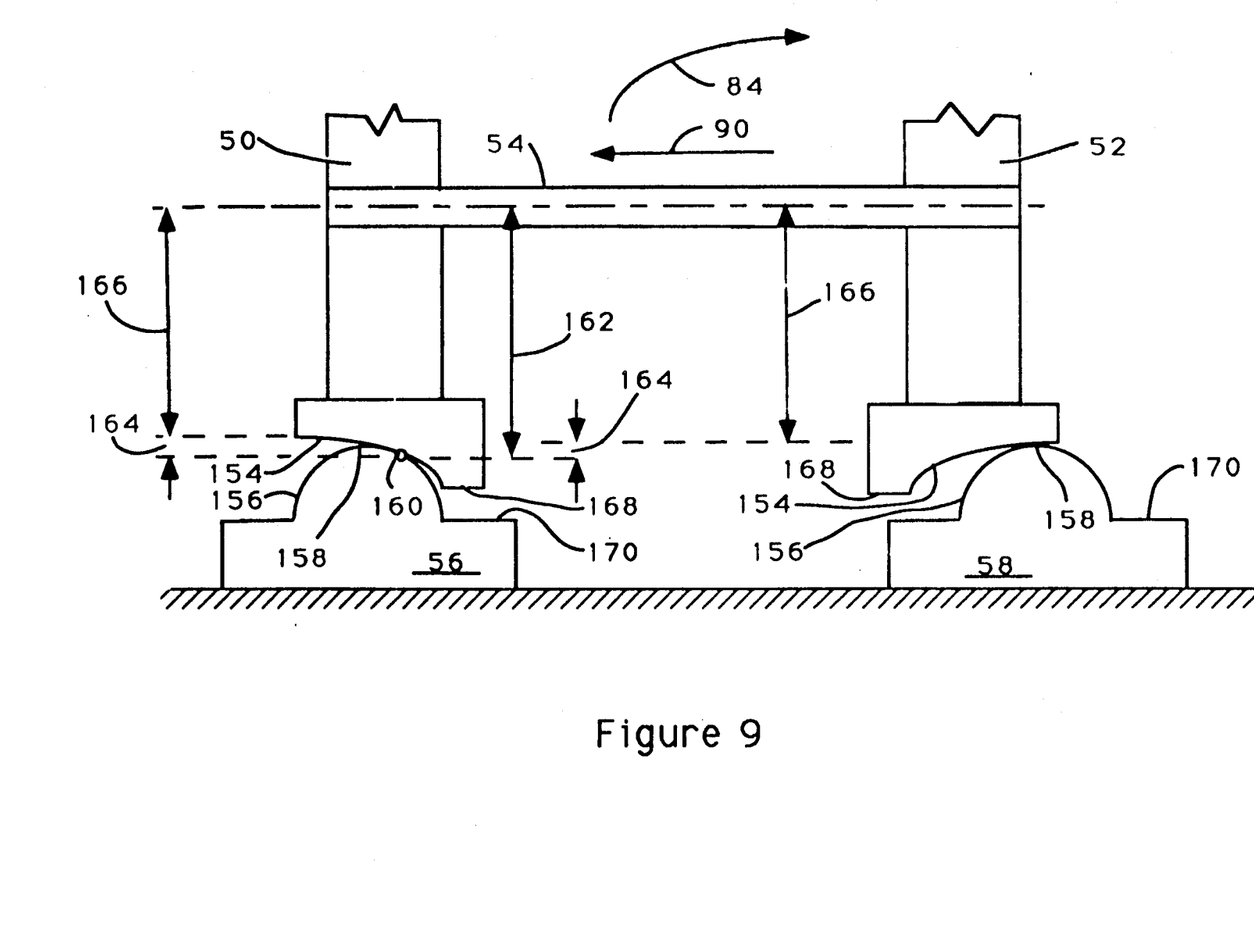
FIG. 9 is a sectional view of a second embodiment of the wheel and rail assembly of the present invention.

The combination of guide members 136, 138 and flanges 126, 128 causes the vehicle to move in the desired direction, preventing lateral motion, when crossing transition sections of track, such as the junction 130 or crossover 152. It is to be understood that in its broadest embodiment, the apparatus of the present invention contemplates the ball-and-socket wheel and rail assembly as previously described. In such embodiment, the convex rolling surface 62 of the wheels cooperates with the concave contact surface 66 of the rails. As illustrated in FIG. 9, the ball-and-socket figuration may have the concave and convex surfaces reversed, such that the wheels 50, 52 are manufactured with concave rolling surfaces 154 mating with the convex contact surfaces 156 of rails 56, 58. In the embodiment of FIG. 10, the wheels are affixed to axle 54 and driven in the same manner indicated above. When making a turn in the direction of arrow 84, centrifugal force operates to displace the vehicle in direction of arrow 90. When the vehicle is moving in a straight line, the rolling surfaces 154 will preferably contact the contact surfaces 156 of the rails at a contact point 158 located approximately at the apex of the surface 156. When the vehicle moves in the direction of arrow 90 during a turn in the direction of arrow 84, the contact point of wheel 50 moves downwardly, to 160, thereby increasing the effective rolling radius 162 by an amount indicated at 164. The effective rolling radius 166 of wheel 52 is shorter than the effective rolling radius 162 of wheel 50 by the amount 164, thereby causing the outer wheel to traverse a greater distance than inner wheel 52.

In the embodiment of FIG. 9, the radius of curvature of the contact surface 156 is less than the radius of curvature of the rolling surface 154, thereby permitting single-point contact between the surfaces at any potential contact point. The difference in radii of curvature causes the convex surface 156 to "nest" within the concave surface 154. In the embodiment of FIG. 9, in a turnout or cross-over the contact surface 156 of the rails will be removed and the rail will have a flat upper surface coincident with the surface 170. In such case, the flat rolling surface 168 of the wheels will roll upon surface 170 through the turnout or crossover.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:
1. In a rail transportation vehicle, a wheel and rail apparatus having a straight rail section and a curved rail section, comprising:
   a. said vehicle having at least two pairs of wheels, each pair of wheels having an innermost and outermost wheel laterally disposed at distal ends of and securely affixed to an axle;
   b. each of said wheels having a convex rolling surface with a first radius of curvature;
   c. a pair of laterally spaced rails cooperating with said wheels, each of said rails having a flat surface and a concave contact surface with a second radius of curvature greater than the first radius of curvature of said rolling surface, and wherein when the vehicle is on the curved rail section, said innermost wheel is adjacent a lesser radius of curvature rail; and
   d. wherein when said vehicle is moving on the straight rail section, an effective rolling radius of each wheel in a pair of wheels is essentially identical, and wherein when the vehicle follows the curved rail section, a centrifugal force causes the innermost wheel to have its effective rolling radius decreased thereby preventing slippage of the inner wheel.

* * * * *